May 1, 1956    J. D. CLEMENTS    2,743,570
TOPPING DEVICE FOR LAWN MOWERS
Filed Sept. 13, 1952    2 Sheets-Sheet 1
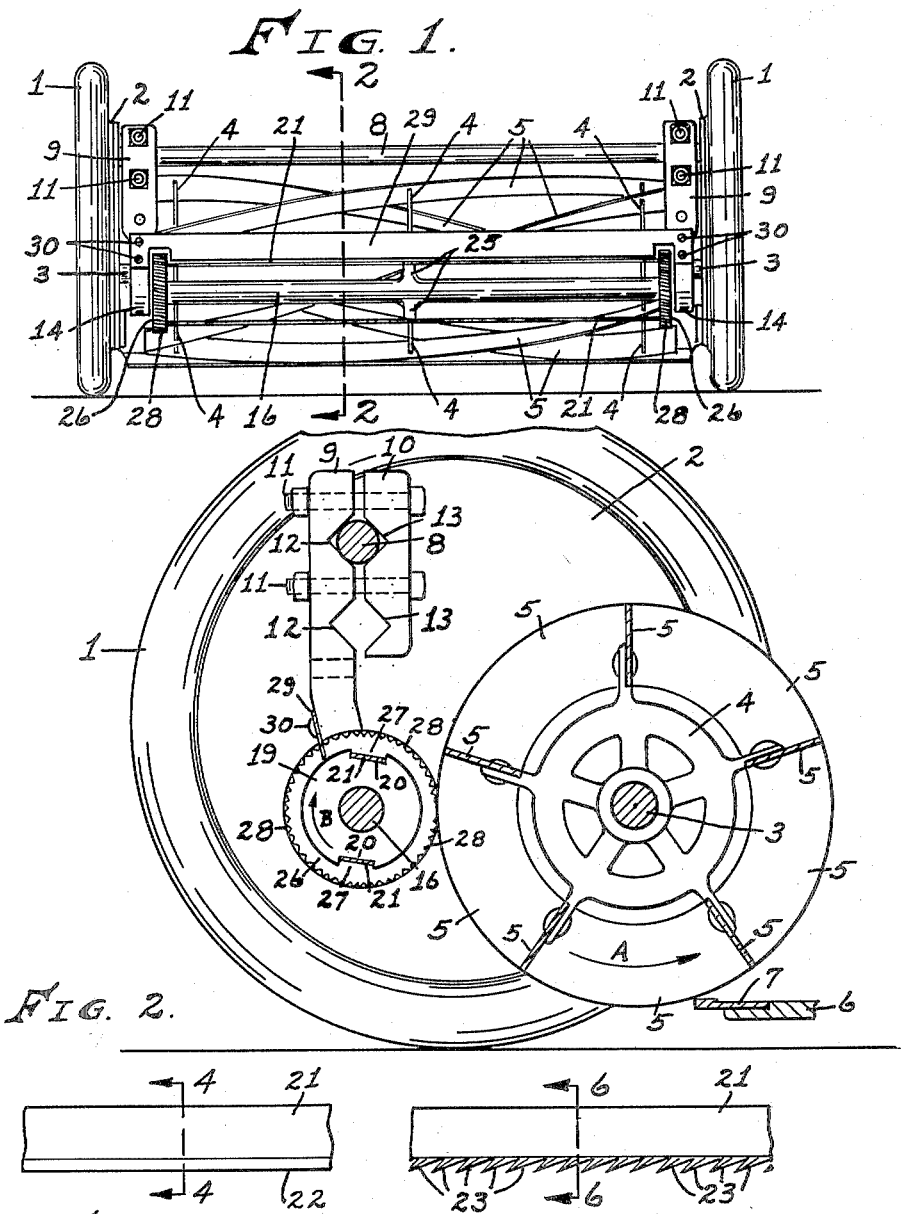
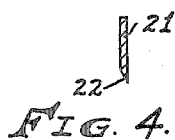
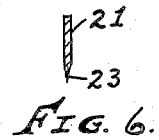
JAMES D. CLEMENTS,
INVENTOR.
BY Donald E. Windle.
ATTORNEY.

May 1, 1956
J. D. CLEMENTS
2,743,570
TOPPING DEVICE FOR LAWN MOWERS
Filed Sept. 13, 1952
2 Sheets-Sheet 2
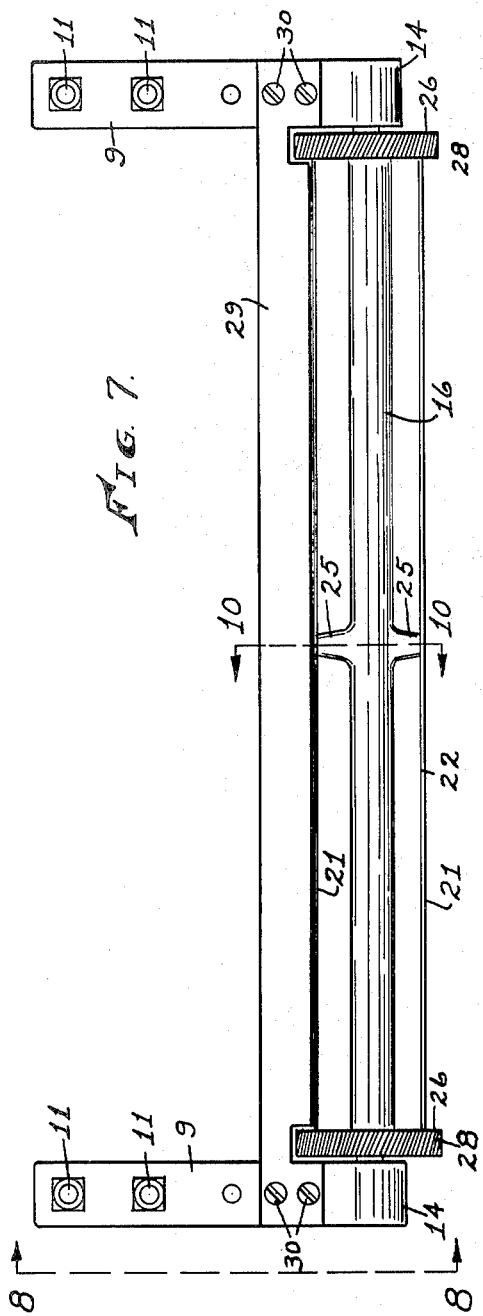
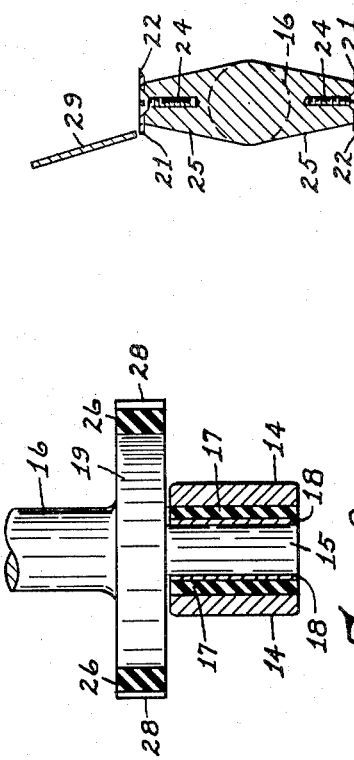
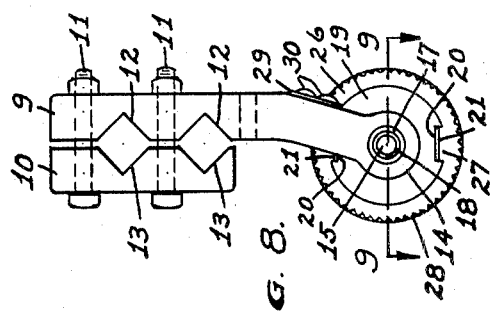
JAMES D. CLEMENTS,
INVENTOR.
BY Donald E. Windle.
ATTORNEY.

United States Patent Office 2,743,570
Patented May 1, 1956

2,743,570

TOPPING DEVICE FOR LAWN MOWERS

James D. Clements, Richmond, Ind.

Application September 13, 1952, Serial No. 309,495

1 Claim. (Cl. 56—238)

The present invention relates particularly to cutting devices which are adapted to be attached to the conventional types of lawn mowers for the purpose of pre-cutting stemmed plants which have grown to such heights to render the conventional revolving type mowers ineffective.

I am fully aware that certain devices have been produced for cutting weeds and the like and, after which, in order to get a well-groomed lawn appearance, it is necessary to operate a lawn mower. The conventional types of revolving reel mowers are effective for mowing grass of nominal height, but will not cut growths of plants more than about three inches. Mowers for the purpose of cutting material too tall for the reel type mowers have been used, with the same employing movable toothed cutter bars operating in conjunction with fixed toothed cutter bars. These mowing machines are composed of a great number of parts and cannot be produced economically.

It is the principal object of the invention to provide a rotating device adapted to be attached to a conventional revolving reel type mower, and with the same being rotated by means of contact thereof with certain members of the mower.

A second object is the provision of a topping attachment which is adapted to fit between the confines of the mower wheels and which does not project beyond the outer periphery of the wheels of the mower to which the device is removably attached.

A third object is the provision of a device adapted to be operated by means of contact with the revolving reel blades of the mower to which the same is attached.

Another object is the provision of a device which is adapted to be removably secured to a conventional type lawn mower, and with the same being adapted to rotate in a direction opposite to that of the reel of the lawn mower.

A further object is the provision of a device which is simple of construction and economical of manufacture.

Further objects and particular advantages of the invention will become more apparent in the course of the following description, with reference being made to the accompanying drawings forming a part hereof, in which:

Figure 1 is a front elevational view of a conventional reel type lawn mower having the invention embodied therein.

Figure 2 is an enlarged detail section through the lawn mower, as taken on line 2—2 of Figure 1.

Figure 3 is an enlarged partial plan view of one of the blades used in the topping device.

Figure 4 is a detail section through the blade shown in Figure 3, as taken on line 4—4 of Figure 3.

Figure 5 is a partial plan view of a modified form of blade used in the device.

Figure 6 is a detail section, taken on line 6—6 of Figure 5, through the blade shown in Figure 5.

Figure 7 is an enlarged front elevational view of the topping device with the same being unattached to a lawn mower.

Figure 8 is an end view of the device, taken from line 8—8 of Figure 7.

Figure 9 is an enlarged detail section through one of the journals, as taken on line 9—9 of Figure 8.

Figure 10 is an enlarged detail section through the central spacer member, taken on line 10—10 of Figure 7.

Like characters of reference denote like parts throughout the several views.

In order that the construction, the advantages, and the novel features of the invention may be more readily understood and appreciated, I will take up a detailed description thereof, in which the same will be more fully set forth.

Referring now to the drawings in detail, numerals 1 designate the wheels of the lawn mower. Numerals 2 designate the end plates of the mower, to which the wheels are connected. Numerals 3 designate the reel shaft which extends through and between the end plates. Reel spiders 4 are rigidly secured on the reel shaft and carry the reel blades 5. A cutter bar 6 having a cutter blade 7 secured thereto, forms the shearing means of the mower. A tie bar 8 extends between the end plates of the mower and serves to maintain the end plates in rigid relation with each other. The preceding description of the members are of the conventional lawn mower with which the topping device is adapted to be used.

The topping device is provided with end hanger members 9 which have companion members 10 and are adapted to be removably secured on tie rod 8 by means of bolts 11. Members 9 have suitable indentations 12 formed therein for positioning and securing the members on the tie rod, while the companion members 10 are provided with like indentations for clamping purposes, as indicated in Figure 2. It will be noted, by referring to Figure 2, that the two sets of indentations in members 9 and the two sets of indentations in companion members 10 provide for different vertical settings of the end members 9 with relation to tie rod 8.

The lower end portions 14 of members 9 are formed to provide journals for ends 15 of shaft member 16. Each of the lower end portions 14 is provided with a sleeve 17 which is preferably formed of rubber or other suitable yieldable material, and a bearing sleeve 18 which is adapted to receive a respective end portion 15 of shaft 16. The yieldable sleeves 17 provide means permitting self-alignment of the shaft 16 with relation to the end hanger members 9. A hub member 19 is formed near each end of shaft 16 and has oppositely disposed channels 20 formed in the periphery thereof for the reception of end portions of blade members 21, as more clearly shown in Figures 2 and 8.

The topping blade members 21 may either be provided with a beveled leading edge 22 as indicated in Figures 3 and 4 or, if preferred, may be provided with a leading edge having beveled and sharpened teeth 23, as indicated in Figures 5 and 6.

The central portions of the topping blade members 21 are removably secured, by means of screws 24, to post members 25 which are oppositely disposed and formed on the shaft 16, as indicated in Figures 7 and 10.

A yieldable tread member 26 is applied on each of the hub members 19 by means of a suitable cement. Each of the tread members has an inwardly extending lug 27 formed integrally therewith, with the lugs being adapted to extend into the channels 20 of the hub members, and with the lugs being adapted to fit against the end portions of blades 21 and forming a retainer thereby. Each of the tread members has serrations 28 formed in the outer periphery thereof, the purpose of which will be hereinafter set forth.

A tie strap 29 is provided between hanger members 9 and is secured thereto by means of screws 30, as more clearly shown in Figures 7 and 8. The tie strap 29 is made in the form of a blade with the lower edge thereof being in close proximity with the path of blades 22, as indicated in Figures 2, 7 and 10. Strap 29, other than providing for tying hangers 9 together, provides means preventing revolving blades 21 from carrying stems and the like into the mower and also preventing, by presenting a shearing edge, vines and the like from wrapping around the reel formed by the blades 21.

Operation

With the topping device assembled as shown in Figures 7 and 8, the same is secured to the tie rod 8 of the lawn mower by means of bolts 11. Before tightening bolts 11, the lower end of the device is swung rearwardly until treads 26 are in firm contact with end portions of reel blades 5, after which bolts 11 are tightened and holding the treads in engageable relation with the end portions of reel blades 5.

In the operation of the mower, the end portions of the reel blades engage the serrations 28 of the treads 26 which causes rotation of the shaft 16 together with blades 21. In the mowing operation, the mower reel blades travel in the direction as idicated by the arrow A shown in Figure 2, with such rotation of the mower reel blades causing shaft 16 and topping blades 21 to revolve in the opposite direction, as indicated by arrow B in Figure 2.

It will be noted that, due to the difference in the outer diameters of the mower reel blades 5 and the outer diameters of treads 26, shaft 16 and blades 21 are revolved at a much higher speed than the rotation of the mower reel. The high speed rotation of the topping device blades cause the blades to engage and cut stems and the like before the engagement therewith by the lawn mower reel blades.

The topping device is intended primarily for the purpose of topping plants which grow much faster than lawn grass and which grow to such a height that the same are not engageable for shearing by the lawn mower reel blades.

It is brought out that the topping device is confined within the limits of the lawn mower, in that the same is of such length to fit between the end plates of the mower, and that the same does not project forwardly of the mower wheels. This feature provides protection to the device while the mower is in operation and while the same is being transported.

I desire that it be understood that, while the preferred form of the invention is shown and described, I am not to be limited to the specific form and arrangement of the parts herein shown and described, but that changes may be made therein, insofar as the changes may fall within the scope of the appended claim.

Having now shown and described the invention, what I claim is:

In a topping device, a pair of spaced-apart hanger members, a shaft having its ends journalled in the hanger members, a hub member located near each end of the shaft, blade members extending between and let into the hub members, a yieldable tread member positioned on each of the hub members and confining the ends of the blade members against centrifugal displacement, means formed on the shaft at the central portion thereof providing posts into which the blades are removably secured, with a tie strap extending between and secured to the hanger members with the lower edge of the tie strap being in substantial shearing relation with the blade members, with the topping device being adapted to attachment with a lawn mower within the limits thereof, with the yieldable tread members being engaged by the rotating reel blades of the lawn mower, and with the blade members of the topping device being rotated in a direction opposite to that of the rotating reel blades of the lawn mower through engagement of the reel blades with the yieldable tread members of the topping device.

References Cited in the file of this patent

UNITED STATES PATENTS

| | | |
|---|---|---|
| 887,461 | Card | May 12, 1908 |
| 1,047,194 | Franke | Dec. 17, 1912 |
| 1,607,382 | Zakrezewsky | Nov. 16, 1926 |
| 1,953,186 | Mueller | Apr. 3, 1934 |
| 2,104,343 | Fish | Jan. 4, 1938 |